(12) United States Patent
Bhakta et al.

(10) Patent No.: US 12,442,967 B2
(45) Date of Patent: Oct. 14, 2025

(54) OPTICAL SYSTEMS HAVING GRADIENT INDEX OPTICAL STRUCTURES

(71) Applicant: Apple Inc., Cupertino, CA (US)

(72) Inventors: Vikrant Bhakta, Santa Clara, CA (US); Scott M. DeLapp, San Diego, CA (US); Jonathan B. Pfeiffer, Lafayette, CO (US); Hyungryul Choi, San Jose, CA (US); Guolin Peng, Sunnyvale, CA (US)

( * ) Notice: Subject to any disclaimer, the term of this patent is extended or adjusted under 35 U.S.C. 154(b) by 628 days.

(21) Appl. No.: 17/482,149

(22) Filed: Sep. 22, 2021

(65) Prior Publication Data

US 2022/0011496 A1 Jan. 13, 2022

Related U.S. Application Data

(63) Continuation of application No. PCT/US2021/013504, filed on Jan. 14, 2021.
(Continued)

(51) Int. Cl.
*G02B 3/00* (2006.01)
*F21V 8/00* (2006.01)
(Continued)

(52) U.S. Cl.
CPC ......... *G02B 6/0023* (2013.01); *G02B 3/0087* (2013.01); *G02B 6/34* (2013.01); *G02B 27/0172* (2013.01); *G02B 2027/0178* (2013.01)

(58) Field of Classification Search
CPC ............ G02B 3/0087; G02B 2027/011; G02B 2027/0116–0121; G02B 2027/0178;
(Continued)

(56) References Cited

U.S. PATENT DOCUMENTS 5,886,822 A 3/1999 Spitzer
6,181,475 B1 * 1/2001 Togino ............... G02B 17/0856
359/630

(Continued)

FOREIGN PATENT DOCUMENTS

WO 9963367 A1 12/1999

*Primary Examiner* — Bumsuk Won
*Assistant Examiner* — Samanvitha Sridhar
(74) *Attorney, Agent, or Firm* — Treyz Law Group, P.C.; Michael H. Lyons; Jinie M. Guihan

(57) ABSTRACT

An electronic device may include a waveguide with an input coupler and an output coupler. The input coupler may receive the image light from imaging optics. The input coupler may be an input coupling prism and the imaging optics may include lens elements. World light may be viewable at an eye box through the output coupler. Biasing, compensation, and/or prescription lenses may overlap the output coupler. The input coupling prism, the lens elements in the imaging optics, and/or one or more of the biasing, compensation, and prescription lenses may be formed from gradient index (GRIN) material. The GRIN material may have a gradient refractive index that varies in one or more gradient directions. Use of GRIN materials may minimize the volume required to form the device without sacrificing optical performance. In addition, the GRIN materials may compensate for dispersion and aberrations in the device.

25 Claims, 7 Drawing Sheets

Related U.S. Application Data

(60) Provisional application No. 62/961,972, filed on Jan. 16, 2020.

(51) Int. Cl.
  *G02B 6/34* (2006.01)
  *G02B 27/01* (2006.01)

(58) Field of Classification Search
  CPC ...... G02B 6/00; G02B 6/0036; G02B 6/0023; G02B 6/005; G02B 2207/101; G02B 27/0172
  See application file for complete search history.

(56) References Cited

U.S. PATENT DOCUMENTS

| | | | |
|---|---|---|---|
| 10,578,870 | B2 | 3/2020 | Kimmel |
| 10,736,489 | B2* | 8/2020 | Goebel .................. A61B 1/05 |
| 11,567,322 | B2* | 1/2023 | Mills ...................... G03H 1/02 |
| 2004/0051107 | A1* | 3/2004 | Nagahama .......... H01L 21/0242 |
| | | | 257/79 |
| 2010/0045927 | A1* | 2/2010 | Moliton ................ G02C 7/027 |
| | | | 351/158 |
| 2015/0219895 | A1 | 8/2015 | Laycock et al. |
| 2016/0124134 | A1 | 5/2016 | Zhu et al. |
| 2017/0090180 | A1* | 3/2017 | Ehrhardt .............. G02B 27/149 |
| 2017/0219999 | A1* | 8/2017 | Serabyn ............... G02B 6/0008 |
| 2018/0011324 | A1 | 1/2018 | Popovich et al. |
| 2018/0031842 | A1* | 2/2018 | Tsai ................... G02B 27/0176 |
| 2019/0374092 | A1* | 12/2019 | Wu .................... G02B 23/2469 |
| 2020/0142196 | A1* | 5/2020 | Mills ....................... G06F 3/013 |

* cited by examiner

OPTICAL SYSTEMS HAVING GRADIENT INDEX OPTICAL STRUCTURES

This application is a continuation of International Patent Application No. PCT/US2021/013504, filed Jan. 14, 2021, which claims the benefit of U.S. Provisional Patent Application No. 62/961,972, filed Jan. 16, 2020, which are hereby incorporated by reference herein in their entireties.

BACKGROUND

This relates generally to optical systems and, more particularly, to optical systems for displays.

Electronic devices may include displays that present images close to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display module that generates image light and an optical system that redirects the light from the display module towards an eye box. The optical system may include a waveguide having an input coupler and an output coupler. The input coupler may receive the image light from imaging optics. The input coupler may be a reflective or transmissive input coupling prism and may couple the image light into the waveguide. The output coupler may couple the image light out of the waveguide and towards an eye box. The imaging optics may include lens elements. World light from real-world objects may be viewable at the eye box through the output coupler. First, second, and optionally a third lens may overlap the output coupler. The world light may be viewable at the eye box through the first, second, and third lenses. The first, second, and third lenses may include biasing, compensation, and/or prescription lenses.

The input coupling prism in the input coupler, the lens elements in the imaging optics, and/or one or more of the first, second, and third lenses may be formed from gradient index (GRIN) material. The GRIN material may have a gradient refractive index that varies in one or more gradient directions. The GRIN material may be provided with an axial GRIN profile, a radial GRIN profile, a spherical GRIN profile, or an arbitrary GRIN profile, as examples. The GRIN material may be formed from stacked nanolayers having different refractive indices if desired. Use of GRIN materials in the optical system may minimize the volume required to form the optical system without sacrificing optical performance. In addition, the GRIN materials may compensate for dispersion and aberrations in the optical system.

DETAILED DESCRIPTION

Figure 1:
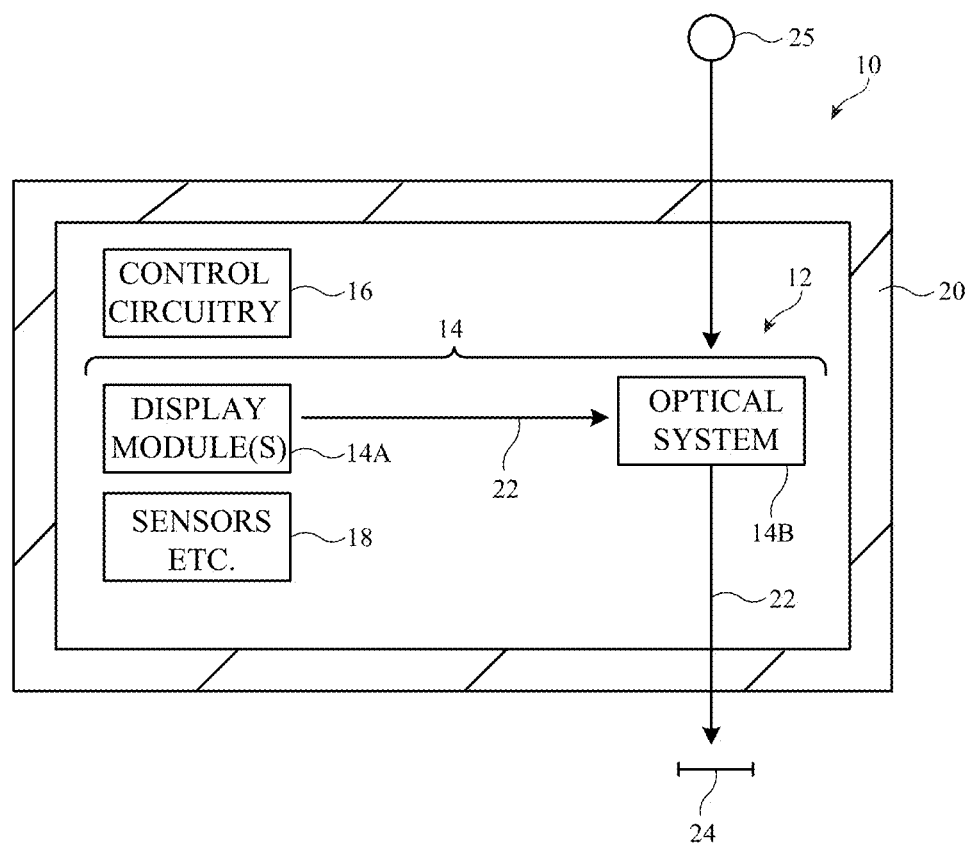
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (image light) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, components 18 may include gaze tracking sensors that gather gaze image data from a user's eye at eye box 24 to track the direction of the user's gaze in real time. As an example, the gaze tracking sensors may include infrared or other light emitters that emit infrared light or other light towards the eye box and image sensors that sense the infrared or other light reflected off of the user's eye (e.g., where the sensed light identifies the gaze direction of the user's eye).

Display modules 14A may include reflective displays (e.g., liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
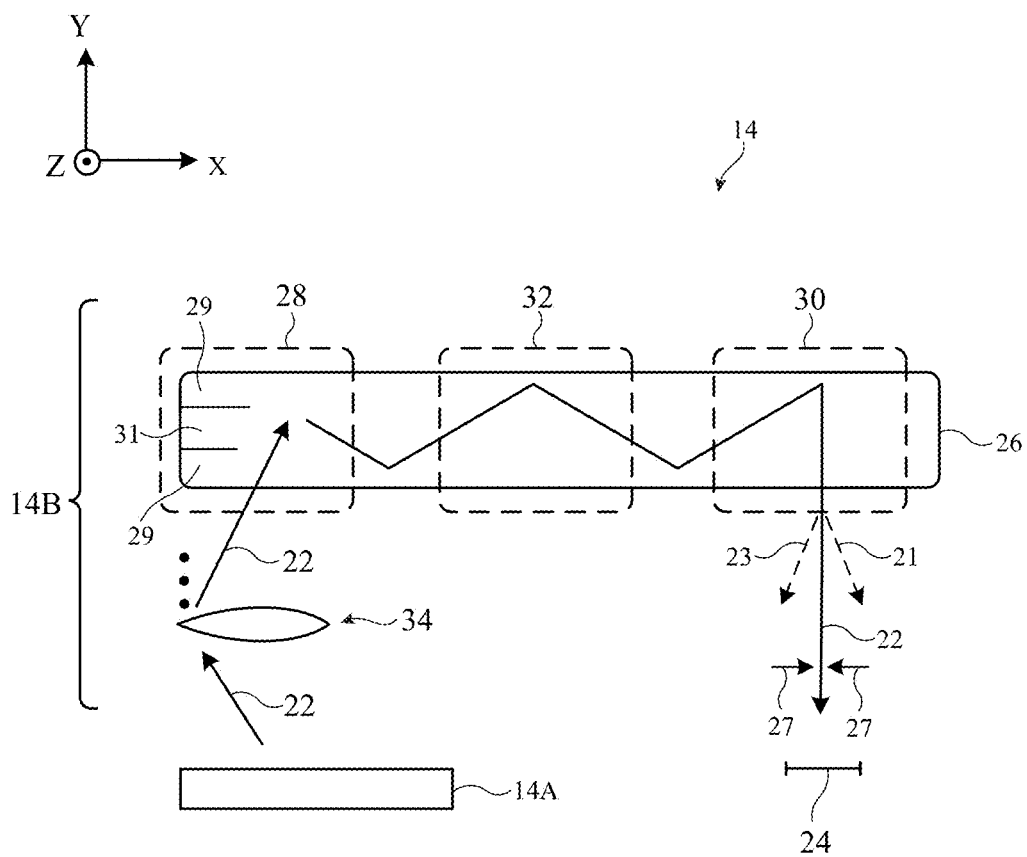
FIG. 2 is a top view of an illustrative optical system for a display having a waveguide with an input coupler and an output coupler in accordance with some embodiments.

FIG. 2 is a top view of an illustrative display 14 that may be used in system 10 of FIG. 1. As shown in FIG. 2, near-eye display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc. In the example of FIG. 2, waveguide 26 includes waveguide substrate layers 29 and media layer 31 (e.g., a layer of holographic recording medium interposed between optically transparent waveguide substrate layers 29). This is merely illustrative.

If desired, waveguide 26 may also include one or more layers of holographic recording media such as media layer 31 (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as imaging optics 34. Imaging optics 34 (sometimes referred to herein as imaging lens 34) may include one or more lens elements that help direct image light 22 towards waveguide 26. If desired, display module 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may generate light 22 associated with image content to be displayed to eye box 24. Light 22 may be collimated using a lens such as a lens in imaging optics 34. Optical system 14B may be used to present light 22 output from display module 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26 (e.g., within media layer 31 and/or substrate layers 29), may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide light 22 down its length via total internal reflection. Input coupler 28 may be configured to couple light 22 from display module 14A (imaging optics 34) into waveguide 26, whereas output coupler 30 may be configured to couple light 22 from within waveguide 26 to the exterior of waveguide 26 and towards eye box 24. For example, display module 14A may emit light 22 in direction +Y towards optical system 14B. When light 22 strikes input coupler 28, input coupler 28 may redirect light 22 so that the light propagates within waveguide 26 via total internal reflection towards output coupler 30 (e.g., in direction X). When light 22 strikes output coupler 30, output coupler 30 may redirect light 22 out of waveguide 26 towards eye box 24 (e.g., back along the Y-axis). In scenarios where cross-coupler 32 is formed at waveguide 26, cross-coupler 32 may redirect light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, or other reflectors). In arrangements where couplers 28, 30, and 32 are based on holographic optics, couplers 28, 30, and 32 may include diffractive gratings (e.g., volume holograms, surface relief gratings, etc.).

If care is not taken, the optical components in optical system 14B may configure optical system 14B to be undesirably bulky in order to achieve desired levels of optical performance. In addition, if care is not taken, dispersion effects associated with different indices of refraction as a function of wavelength for the different materials used to form the optical components of optical system 14B can limit the optical performance of optical system 14B. For example, un-compensated dispersion effects may cause some wavelengths of light 22 to be coupled out of waveguide 26 in a first direction (e.g., as shown by arrow 23) while causing other wavelengths of light 22 to be coupled out of waveguide 26 in a second direction (e.g., as shown by arrow 21). It may therefore be desirable to be able to provide optical system 14B with optical components that occupy as small a volume as possible while still exhibiting satisfactory levels of optical performance (e.g., while mitigating dispersion effects such that all wavelengths of light 22 are coupled out of the waveguide in a desired direction, as shown by arrows 27).

Figure 3:
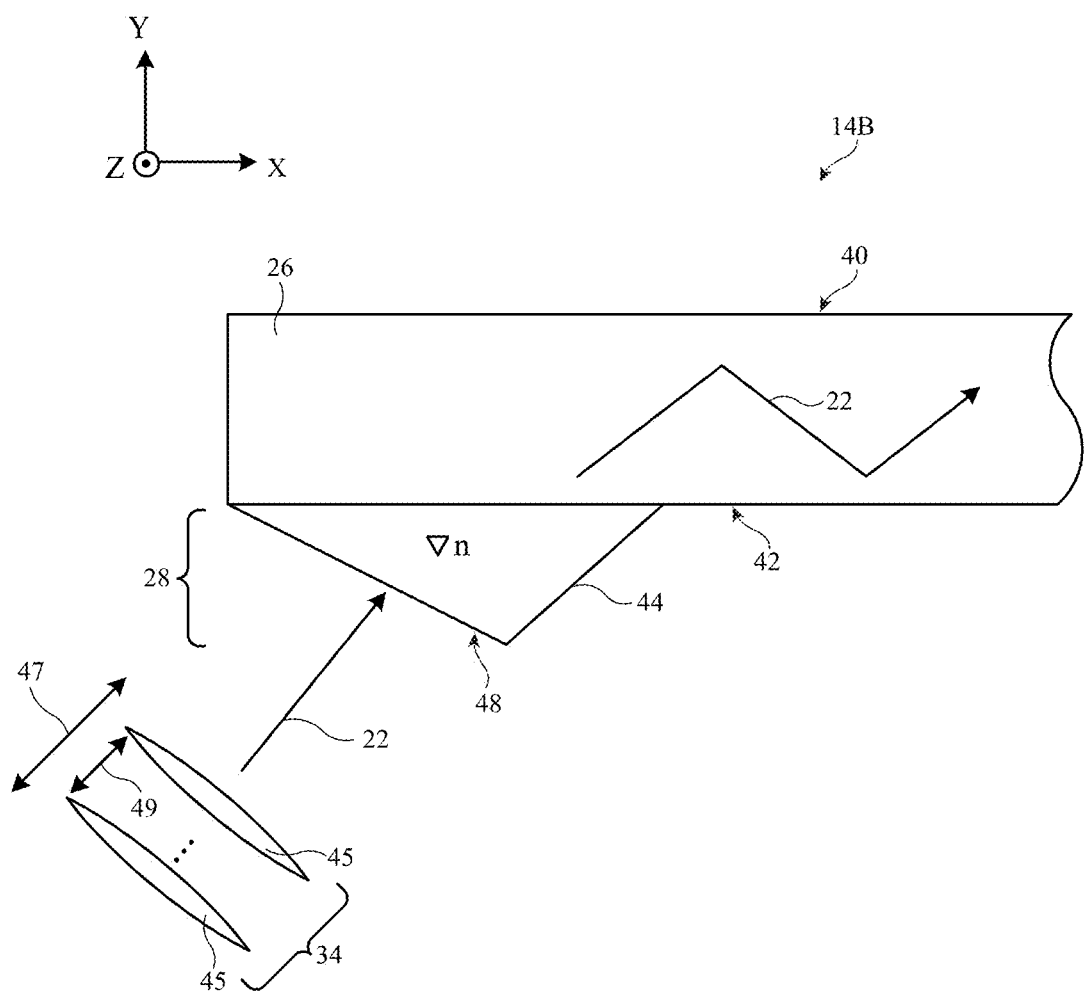
FIG. 3 is a top view of an illustrative transmissive input coupling prism formed from a gradient index material for coupling image light into a waveguide in accordance with some embodiments.

FIG. 3 is a top view of optical system 14B showing how input coupler 28 may be configured to minimize volume while still exhibiting satisfactory levels of optical performance. As shown in FIG. 3, input coupler 28 includes a transmissive input coupling prism such as input coupling prism 44. Input coupling prism 44 is mounted to (lateral) surface 42 of waveguide 26 (e.g., using optically clear adhesive). If desired, there may be an optional coating layer such as a dielectric coating layer disposed on surface 42 and (interposed) between input coupling prism 44 and waveguide 26 (not shown in FIG. 3 for the sake of clarity). The optional coating layer may be configured to optimize light coupling efficiency into the waveguide, for example. Waveguide 26 has a (lateral) surface 40 that opposes surface 42. Surfaces 40 and 42 may be planar if desired. Waveguide 26 may have one or more substrate layers such as substrate layers 29 of FIG. 2 and/or one or more media layers such as media layer 31 of FIG. 2 (not shown in FIG. 3 for the sake of clarity). Media layer 31 may sometimes be referred to herein as a layer of grating medium (e.g., holographic recording medium). Input coupling prism 44 has an input face 48 that receives image light 22 from imaging optics 34. Input coupling prism 44 may couple image light 22 into waveguide 26 (e.g., through surface 42) at angles such that image light 22 propagates down the length of waveguide 26 (e.g., along dimension X) via total internal reflection.

In general, the refractive index of input coupling prism 44 affects how image light 22 is coupled into waveguide 26. The refractive index of input coupling prism 44 also varies as a function of wavelength. One or more surfaces of input coupling prism 44 may be curved to impart image light 22 with an optical power upon coupling into waveguide 26 (e.g., the surface contacting surface 42, surface 48, surfaces internal to input coupling prism 44, etc.). In general, the material used to form input coupling prism 44 determines the refractive index of input coupling prism 44. In some scenarios, input coupling prism 44 is formed using a homogenous material that has a constant (e.g., homogeneous) index of refraction as a function of wavelength across the volume of input coupling prism 44. However, forming input coupling prism 44 using homogenous materials in this way may cause input coupling prism 44 to be undesirably bulky. In other scenarios, input coupling prism 44 is formed using two or three wedges of different materials having different refractive indices. Forming input coupling prism 44 in this way may help to compensate for dispersion effects but can still be undesirably bulky.

In one suitable arrangement that is described herein as an example, input coupling prism 44 may be formed from an optically transparent gradient index (GRIN) material. Input coupling prism 44 may therefore sometimes be referred to herein as gradient index (GRIN) input coupling prism 44. The GRIN material may have a refractive index that varies across the volume of input coupling prism 44 (e.g., in one or more directions). This varying refractive index may sometimes be referred to herein as (refractive) index gradient $4n$. Index gradient $4n$ may have corresponding gradient directions (e.g., pointing in the direction from higher refractive indices to lower refractive indices). In one exemplary arrangement, the direction of index gradient $4n$ is parallel to the direction of propagation of image light 22 through GRIN input coupling prism 44. This is merely illustrative.

If desired, GRIN input coupling prism 44 may have one or more curved surfaces that help to impart optical power onto image light 22. Forming GRIN input coupling prism 44 using a GRIN material may configure input coupling prism 44 to perform dispersion compensation and/or to perform some beam deflection so that image light 22 is coupled into waveguide 26 with satisfactory optical performance (e.g., mitigating aberration and/or dispersion), while also reducing the size of the input coupling prism relative to scenarios where homogenous materials are used. For example, the dimensions of GRIN input coupling prism 44 along the X axis, the Z axis, and/or the Y axis of FIG. 3 may be less than in scenarios where the input coupling prism is formed from a homogenous index material.

As shown in FIG. 3, imaging optics 34 may include one or more lens elements 45. Lens elements 45 may include any desired lens elements having any desired shapes (e.g., lens elements having planar surfaces, concave surfaces, convex surfaces, spherical surfaces, aspherical surfaces, freeform surfaces, etc.) and arranged in any desired manner. In some scenarios, lens elements 45 may include doublets of lens elements. If desired, one or more lens elements 45 in imaging optics 34 may be formed from a GRIN material. Forming one or more lens elements 45 from a GRIN material may reduce the volume of imaging optics 34 without sacrificing optical performance relative to scenarios where imaging optics 34 are free from GRIN materials. For example, imaging optics 34 may include a doublet of lens elements 45 such that imaging optics 34 spans length 47. If desired, the doublet of lens elements 45 may be replaced by a single lens element 45 formed from a GRIN material (e.g., while offering the same optical performance as the doublet of lens elements). This may configure imaging optics 34 to span length 49 rather than length 47, thereby occupying less volume in optical system 14B.

Figure 4:
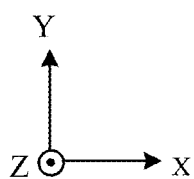
FIG. 4 is a top view of an illustrative reflective input coupling prism formed from a gradient index material for coupling image light into a waveguide in accordance with some embodiments.
Figure 4:
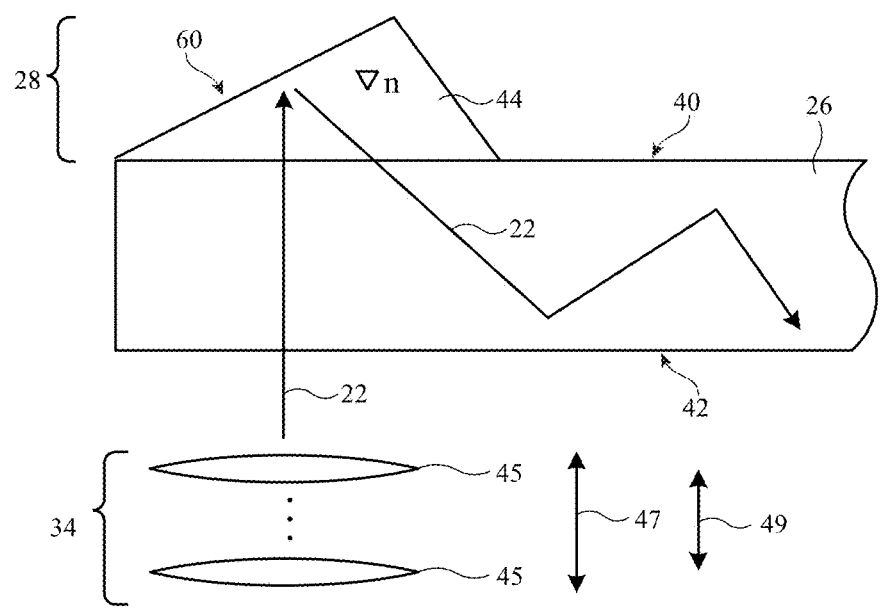

In the example of FIG. 3, GRIN input coupling prism 44 is a transmissive input coupling prism (e.g., a GRIN transmissive input coupling prism) located on the same side of waveguide 26 as imaging optics 34. This is merely illustrative. In another suitable arrangement, GRIN input coupling prism 44 may be a reflective input coupling prism (e.g., a GRIN reflective input coupling prism) located on the side of waveguide 26 opposite imaging optics 34. FIG. 4 is a diagram showing how GRIN input coupling prism 44 may be a reflective input coupling prism located on the side of waveguide 26 opposite imaging optics 34.

As shown in FIG. 4, GRIN input coupling prism 44 may be mounted to surface 40 of waveguide 26 (e.g., using optically clear adhesive). If desired, there may be an optional coating layer such as a dielectric coating layer disposed on surface 40 and (interposed) between input coupling prism 44 and waveguide 26 (not shown in FIG. 4 for the sake of clarity). The optional coating layer may be configured to optimize light coupling efficiency into the waveguide, for example. Surface 42 of waveguide 26 faces imaging optics 34. Image light 22 from imaging optics 34 passes through surface 42 and surface 40. The image light propagates through GRIN input coupling prism 44 and reflects off of reflection surface 60. Reflection surface 60 may be uncoated or may be provided with a reflective coating to increase the amount of light reflected off of surface 60. Surface 60 may be curved if desired (e.g., to provide image light 22 with optical power). The image light 22 reflected off of surface 60 may be coupled into waveguide 26 through surface 40 (e.g., at angles such that the image light propagates down the waveguide via total internal reflection). GRIN input coupling prism 44 may have be formed from GRIN materials having index gradient 4n pointing in one or more directions. When configured in this way, GRIN input coupling prism 44 may couple image light 22 into waveguide 26 with satisfactory optical performance, while compensating for dispersion effects, and while minimizing the volume of the input coupling prism relative to scenarios where homogenous index materials are used. GRIN materials may be used to form one or more of the lens elements 45 in imaging optics 34 of FIG. 4 if desired (e.g., to reduce the size of imaging optics 34 from length 47 to length 49).

FIGS. 5A-5D are diagrams showing how GRIN material used to form lens elements 45 and/or input coupling prism 44 of FIGS. 3 and 4 may have index gradients 4n pointing in different gradient directions. As shown in FIGS. 5A-5D, GRIN material 75 may be used to form lens elements 45 and/or input coupling prism 44 of FIGS. 3 and 4.

Figure 5A:
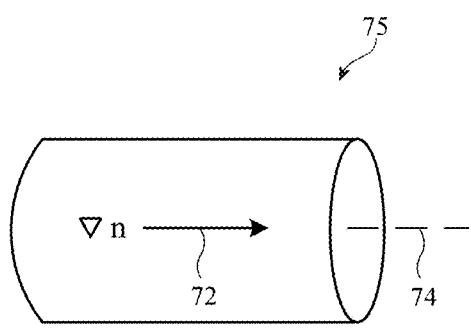
FIGS. 5A-5D are diagrams showing how illustrative gradient index material used in an optical system may have different refractive index gradient configurations in accordance with some embodiments.

As shown in FIG. 5A, GRIN material 75 may be provided with an axial GRIN profile. In this configuration, GRIN material 75 may have an index gradient 4n that points in the direction of arrow 72 parallel to longitudinal (e.g., central) axis 74 (e.g., such that GRIN material 75 exhibits a higher refractive index towards the left of FIG. 5A than towards the right of FIG. 5A or vice versa). The direction of axis 74 (and thus index gradient 4n) may, for example, be oriented parallel to the direction of propagation of image light 22 (FIGS. 3 and 4). The optical component formed from GRIN material 75 of FIG. 5A may, for example, provide correction for spherical aberration and dispersion compensation in optical system 14B.

Figure 5B:
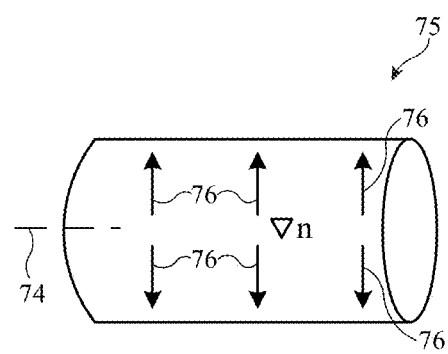

As shown in FIG. 5B, GRIN material 75 may be provided with a radial GRIN profile. In this configuration, GRIN material 75 may have an index gradient 4n that points in the direction of arrows 76, radially outwards from longitudinal axis 74 (e.g., such that the GRIN material 75 exhibits a higher refractive index closer to axis 74 than farther from axis 74 or vice versa). The direction of arrows 76 (and thus index gradient 4n) may, for example, be oriented perpendicular (orthogonal) to the direction of propagation of image light 22 (FIGS. 3 and 4). The optical component formed from GRIN material 75 of FIG. 5B may, for example, provide optical power, correction for chromatic aberration, and dispersion compensation in optical system 14B.

Figure 5C:
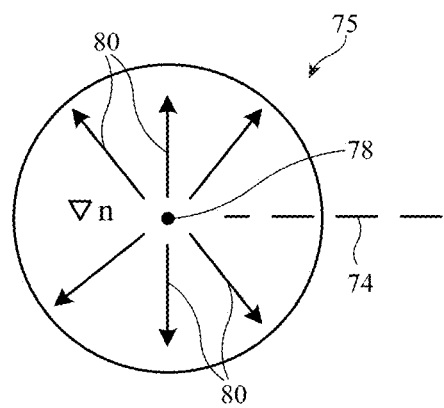

As shown in FIG. 5C, GRIN material 75 may be provided with a spherical GRIN profile. In this configuration, GRIN material 75 may have an index gradient 4n that points in the direction of arrows 80, spherically outwards from point 78 (e.g., such that the GRIN material 75 exhibits a higher refractive index closer to point 78 than farther from point 78 or vice versa). The optical component formed from GRIN material 75 of FIG. 5C may, for example, provide optical power, correction for chromatic aberration, and dispersion compensation in optical system 14B.

Figure 5D:
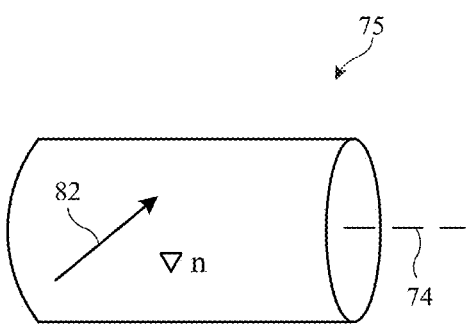

As shown in FIG. 5D, GRIN material 75 may be provided with an arbitrary GRIN profile. In this configuration, GRIN material 75 may have an index gradient 4n that points in the direction of arrow 82, oriented at any desired angle with respect to axis 74 (e.g., such that the GRIN material 75 exhibits a higher refractive index closer to the tail of arrow 82 than the tip of arrow 82 or vice versa). The optical component formed from GRIN material 75 of FIG. 5D may, for example, provide optical power, correction for chromatic aberration, and dispersion compensation for optical system 14B. The examples of FIGS. 5A-5D are merely illustrative. Index gradient 4n in each of these examples may vary linearly (e.g., along the length of arrows 72, 76, 80, or 82), non-linearly, or following any desired profile (e.g., a continuously curved profile, a discontinuous profile, etc.). GRIN profiles that are formed from combinations of these arrangements may be used if desired.

Figure 6:
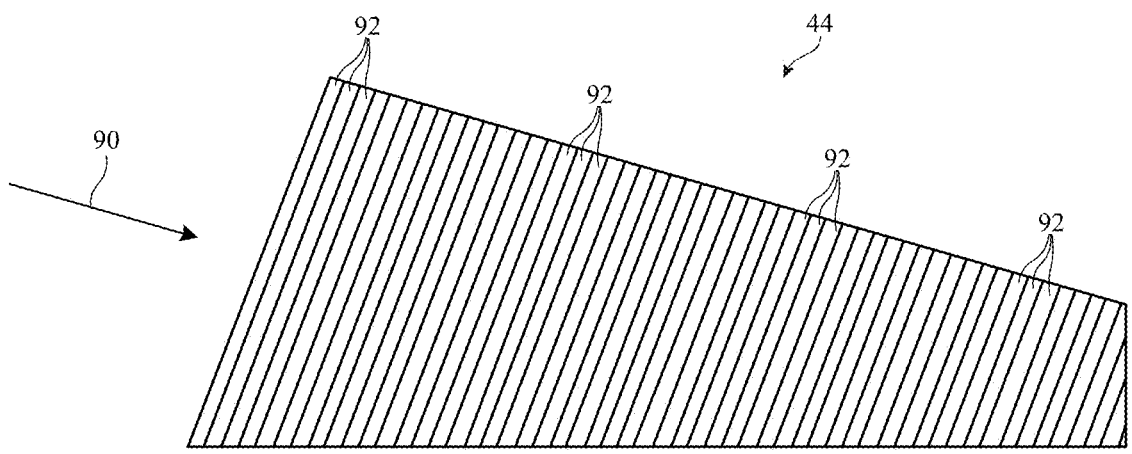
FIG. 6 is a top view of an illustrative transmissive input coupling prism that includes multiple stacked nanolayers that configure the transmissive input coupling prism to exhibit a gradient refractive index in accordance with some embodiments.

If desired, the GRIN material used to form GRIN input coupling prism 44 of FIGS. 3 and 4 may include multiple stacked nanolayers having different refractive indices. FIG. 6 is a diagram showing how the GRIN material used to form GRIN input coupling prism 44 of FIGS. 3 and 4 may include multiple stacked nanolayers having different refractive indices. As shown in FIG. 6, GRIN input coupling prism 44 may include a set of stacked nanolayers 92. Nanolayers 92 may have thicknesses on the nanometer or micrometer scale. Each nanolayer 92 may have a respective thickness and/or refractive index. If desired, two or more of nanolayers 92 may have the same thickness and/or refractive index. By selecting the thickness and/or refractive index of each nanolayer 92 used in the stack, GRIN input coupling prism 44 may be provided with any desired GRIN profile having one or more index gradient 4$n$ pointing in any desired directions (e.g., the GRIN profiles of FIGS. 5A-5D or other profiles).

In the example of FIG. 6, nanolayers 92 have lateral (e.g., planar) surfaces that are oriented perpendicular to the direction of propagation of image light 22, as shown by arrow 90 (e.g., image light 22 may propagate in the direction of arrow 90 oriented normal to the lateral surface of nanolayers 92). This is merely illustrative. In general, nanolayers 92 may be provided at any desired orientation relative to the direction of image light propagation. While the use of stacked nanolayers 92 is described in FIG. 6 in connection with GRIN input coupling prism 44, stacked nanolayers 92 may also be used to form lens elements 45 in imaging optics 34 of FIGS. 3 and 4 if desired.

Figure 7:
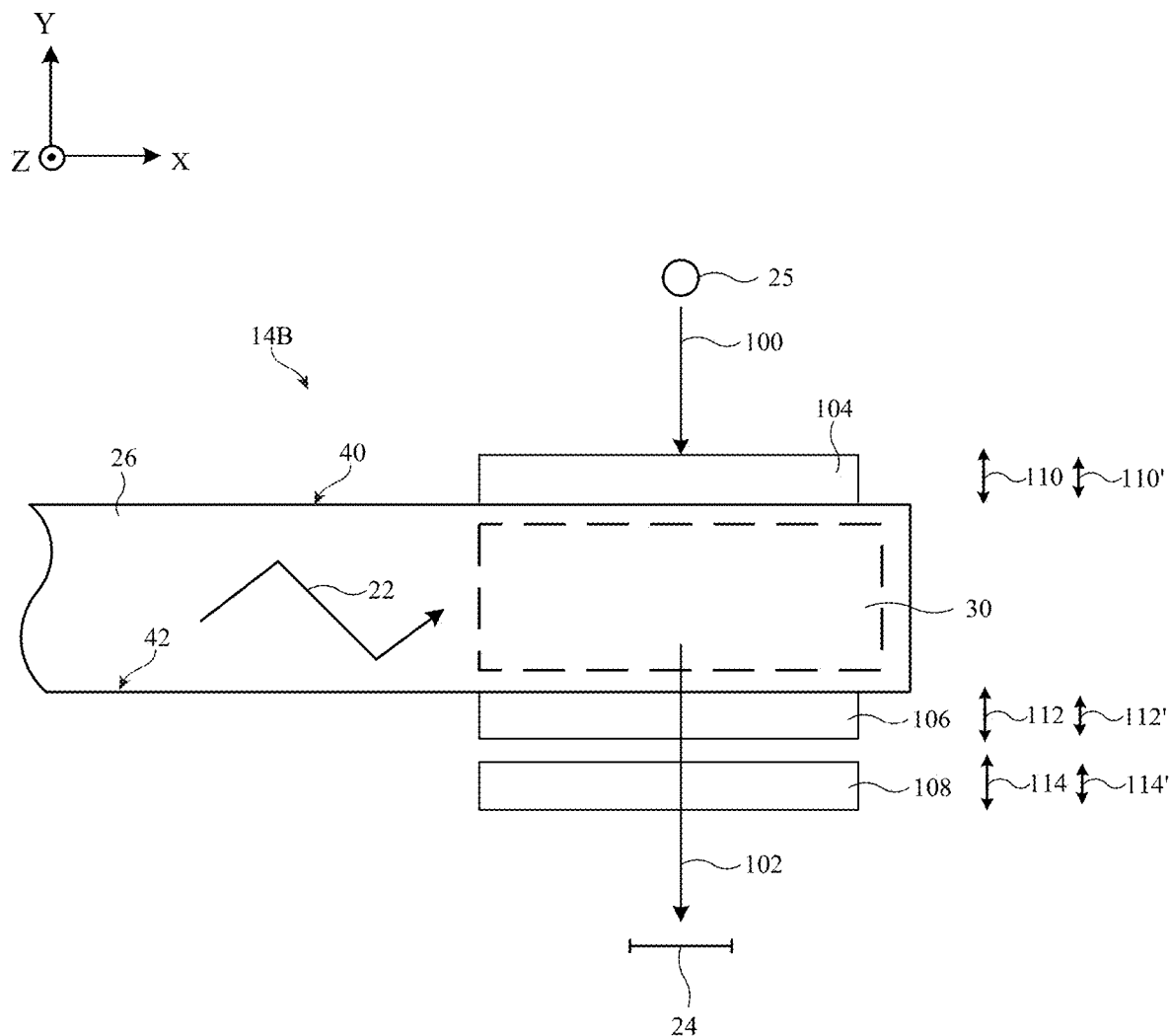
FIG. 7 is a top view of an illustrative output coupler in a waveguide provided with bias, compensation, and/or prescription lenses that may be formed from gradient index material for focusing world light onto an eye box in accordance with some embodiments.

If desired, GRIN materials may be used to form one or more lenses overlapping output coupler 30 on waveguide 26 (FIG. 2). FIG. 7 is a diagram showing how GRIN materials may be used to form one or more lenses overlapping output coupler 30 on waveguide 26. As shown in FIG. 7, output coupler 30 may be formed in waveguide 26 (e.g., within one or more substrate layers 29 and/or one or more media layers 31 of FIG. 2). Output coupler 30 may, for example, include diffractive phase gratings (e.g., volume holograms) recorded in media layer 31 or may include louvered partial mirrors.

Output coupler 30 receives image light 22 that propagates down the length of waveguide 26 via total internal reflection (e.g., image light 22 coupled into the waveguide by input coupler 28 of FIGS. 2-4). Output coupler 30 couples image light 22 out of waveguide 26 and towards eye box 24 as a part of output light 102. In the example of FIG. 7, output coupler 30 also serves as an optical combiner that overlays image light 22 with real world light 100 from real world objects 25 (e.g., output light 102 may include objects or images in image light 22 overlaid with world light 100).

Optical system 14B may include one or more lenses that overlap output coupler 30 (e.g., within the X-Z plane of FIG. 7). For example, optical system 14B may include a first lens 104, a second lens 106, and/or a third lens 108. Lens 104 may be interposed between surface 40 of waveguide 26 and real world object 25. Lens 106 may be interposed between surface 42 of waveguide 26 and eye box 24. Lens 108 may be interposed between lens 106 and eye box 24. Lenses 104, 106, and 108 are transparent and allow real-world image light 100 from real-world objects such as object 25 to pass to eye box 24 for viewing by the user. At the same time, the user can view virtual images associated with computer-generated content that are directed out of waveguide 26 and through lenses 106 and 108 to corresponding eye box 24 by output coupler 30.

The strength (sometimes referred to as the power or diopter) of lens 106 can be selected to place virtual images in image light 22 at a desired distance from device 10. For example, it may be desirable to place computer-generated content such as text, icons, moving images, or other content at a certain virtual image distance. The placement of the virtual object at that distance can be accomplished by appropriate selection of the strength of lens 106. Lens 106 may be a negative lens for users whose eyes do not have refraction errors. The strength (larger net negative power) of lens 106 can therefore be selected to adjust the distance of the virtual object.

If desired, lens 104 may have a complementary power value (e.g., a positive power with a magnitude that matches the magnitude of the negative power of lens 106). For example, if lens 106 has a power of −2.0 diopter, lens 104 may have an equal and opposite power of +2.0 diopter (as an example). In this type of arrangement, the positive power of lens 104 cancels the negative power of lens 106. As a result, the overall power of lenses 104 and 106 taken together will be 0 diopter. This allows a viewer to view real-world objects such as object 25 without optical influence from lenses 106 and 104. For example, a real-world object located far away from device 10 (effectively at infinity), may be viewed as if lenses 106 and 104 were not present. Lens 106 may therefore sometimes be referred to herein as biasing lens 106 whereas lens 104 is sometimes referred to herein as compensation lens 104.

For a user with satisfactory uncorrected vision, this type of complementary lens arrangement therefore allows virtual objects to be placed in close proximity to the user (e.g., at a virtual image distance of 0.5-5 m, at least 0.1 m, at least 1 m, at least 2 m, less than 20 m, less than 10 m, less than 5 m, or other suitable near-to-midrange distance from device 10 while simultaneously allowing the user to view real world objects without modification by the optical components of the optical system). For example, a real-world object located at a distance of 2 m from device 10 (e.g., a real-world object being labeled by a virtual text label at a virtual image distance of 2 m) will optically appear to be located 2 m from device 10. This is merely illustrative and, if desired, lenses 104 and 106 need not be complementary lenses (e.g., lenses 104 and 106 may have any desired optical powers).

Some users may require vision correction. Vision correction may be provided using tunable lenses and/or fixed (e.g., removable) lenses (sometimes referred to as supplemental lenses, vision correction lenses, removable lenses, or clip-on lenses). For example, vision correction may be provided for a user who has astigmatism by adding a removable astigmatism correction lens to the display system of FIG. 1. Other vision correction lenses may also be used, if desired. In general, the vision correction lenses may include lenses to correct for ammetropia (eyes with refractive errors) such as lenses to correct for nearsightedness (myopia), lenses to correct for farsightedness (hyperopia), and lenses to correct for astigmatism, prism lenses to correct for skewed vision, lenses to help accommodate age-related reductions in the range of accommodation exhibited by the eyes (sometimes referred to as presbyopia), and/or other vision disorders.

As shown in FIG. 7, for example, lens 108 may be configured to match a user's normal eyeglass prescription. Lens 108 may therefore sometimes be referred to herein as vision correction lens 108 or prescription lens 108. For example, lens 108 may be a positive lens to correct for a user's farsightedness, a negative lens to correct for a user's nearsightedness, may be an asymmetric lens to correct for a user's astigmatism, may be a progressive lens for a user with presbyopia, etc.

Lenses 104, 106, and 108 may be provided with any desired optical powers and any desired shapes (e.g., plano-convex lenses, plano-concave lenses, convex-concave lenses, etc.). Lens 108 may be omitted if desired. In scenarios where lens 108 is omitted, lens 106 may have a shape that provides desired prescription vision correction. If desired, lens 104, lens 106, and/or lens 108 may be formed from a GRIN material (e.g., having one of the GRIN profiles of FIGS. 5A-5D or having other GRIN profiles with index gradient(s) 4*n* pointing in the direction of light propagation, perpendicular to the direction of light propagation, and/or in any other desired direction). Lenses 104, 106, and 108 may therefore sometimes be referred to herein as GRIN lenses 104, 106, and 108. If desired, lenses 104, 106, and/or 108 may be formed from stacked nanolayers 92 of FIG. 6. If desired, waveguide 26 may include GRIN input coupling prism 44 (e.g., a transmissive prism as shown in FIG. 3 or a reflective prism as shown in FIG. 4), GRIN lenses 104, 106, and/or 108, and/or GRIN lens elements in imaging optics 34 (FIG. 2).

Forming one or more of lenses 104, 106 and 108 as GRIN lenses may minimize chromatic aberrations in output light 102 while also reducing the size of optical system 14B (e.g., in the Y dimension). For example, in scenarios where lens 104 is a GRIN lens, lens 104 may have a thickness 110' that is less than the thickness 110 of the lens in scenarios where lens 104 has a homogenous refractive index. In scenarios where lens 106 is a GRIN lens, lens 106 may have a thickness 112' that is less than the thickness 112 of the lens in scenarios where lens 106 has a homogenous refractive index. In scenarios where lens 108 is a GRIN lens, lens 108 may have a thickness 114' that is less than the thickness 114 of the lens in scenarios where lens 108 has a homogenous refractive index.

These examples are merely illustrative. One or more of lenses 104, 106, and 108 may be omitted. One, two, or all of lenses 104, 106, and 108 may be GRIN lenses. Lenses 104, 106, and 108 may be provided with any desired shapes and optical powers. In one suitable arrangement, lens 104 is a plano-convex lens (e.g., having a planar surface facing waveguide 26 and a convex surface facing real world object 25) having a positive optical power (e.g., +2.0 diopter), lens 106 is a plano-concave lens (e.g., having a planar surface facing waveguide 26 and a concave surface facing eye box 24) having a negative optical power (e.g., a complementary optical power such as −2.0 diopter), and lens 108 is prescription GRIN lens formed from a GRIN material having a desired optical power (e.g., a negative optical power such as −6.0 diopter). Forming lens 108 from a GRIN material may significantly reduce the dimensions of optical system 14B in the Y direction relative to scenarios where lens 108 has a homogenous refractive index. In general, any combination of some or all of lenses 104, 106, and 108 may be formed from GRIN material (e.g., lens 104 may be formed from GRIN material whereas lenses 106 and 108 have homogenous refractive indices, lens 106 may be formed from GRIN material whereas lenses 106 and 108 have homogeneous refractive indices, lenses 106 and 108 may be formed from GRIN material whereas lens 104 has a homogenous refractive index, lenses 104 and 106 may be formed from GRIN material whereas lens 108 has a homogenous refractive index, lenses 104 and 108 may be formed from GRIN material whereas lens 106 has a homogeneous refractive index, etc.).

In another suitable arrangement, lens 108 is omitted and lens 106 is configured to form a prescription lens. In one example, lens 104 may be a plano-convex lens having a positive optical power (e.g., +2.0 diopter) whereas lens 106 is a plano-concave prescription lens having a non-complementary negative optical power (e.g., −8.0 diopter). In another example, lens 104 may be a plano-convex lens having a positive optical power (e.g., +2.0 diopter) whereas lens 106 is a convex-concave prescription lens having a non-complementary negative optical power (e.g., −8.0 diopter). In yet another example, lens 104 may be a convex-concave lens having a positive optical power (e.g., +2.0 diopter) whereas lens 106 is a convex-concave prescription lens having a non-complementary negative optical power (e.g., −8.0 diopter). One or both of lenses 104 and 106 may be formed from a GRIN material in any of these examples. Any desired combination of these arrangements may be used if desired.

In accordance with an embodiment, a display system is provided that includes a display module that produces image light, a waveguide, a gradient index (GRIN) input coupling prism on the waveguide, the GRIN input coupling prism is configured to couple the image light into the waveguide and has a gradient refractive index, and an output coupler on the waveguide, the output coupler is configured to couple the image light out of the waveguide and towards an eye box.

In accordance with another embodiment, the display system includes imaging optics configured to direct the image light towards the GRIN input coupling prism, the waveguide has a first lateral surface facing the imaging optics and a second lateral surface opposite the first lateral surface.

In accordance with another embodiment, the GRIN input coupling prism is a transmissive input coupling prism that is mounted to the first lateral surface of the waveguide.

In accordance with another embodiment, the GRIN input coupling prism is a reflective input coupling prism that is mounted to the second lateral surface of the waveguide.

In accordance with another embodiment, the imaging optics include a GRIN lens element that has an additional gradient refractive index.

In accordance with another embodiment, the GRIN input coupling prism has an axial GRIN profile.

In accordance with another embodiment, the GRIN input coupling prism has a radial GRIN profile.

In accordance with another embodiment, the GRIN input coupling prism has a spherical GRIN profile.

In accordance with another embodiment, the gradient refractive index has a gradient direction oriented parallel to a propagation direction of the image light within the GRIN input coupling prism.

In accordance with another embodiment, the gradient refractive index has a gradient direction oriented non-parallel with respect to a propagation direction of the image light within the GRIN input coupling prism.

In accordance with another embodiment, the gradient refractive index has a gradient direction oriented orthogonal to the propagation direction of the image light within the GRIN input coupling prism.

In accordance with another embodiment, the GRIN input coupling prism includes a set of stacked nanolayers having different refractive indices.

In accordance with another embodiment, the set of stacked nanolayers have lateral surfaces that are oriented orthogonal to a propagation direction of the image light within the GRIN input coupling prism.

In accordance with another embodiment, the output coupler includes a set of volume holograms.

In accordance with an embodiment, a display system is provided that includes a display module that produces image light, a waveguide, an input coupler configured to couple the image light into the waveguide, an output coupler on the waveguide through which world light from a real-world object is viewable at an eye box, the output coupler is configured couple the image light out of the waveguide towards the eye box, and a gradient index (GRIN) lens overlapping the output coupler, the GRIN lens has a gradient refractive index and the world light is viewable at the eye box through the GRIN lens.

In accordance with another embodiment, the display system is provided that includes a first additional lens overlapping the output coupler and through which the world light is viewable at the eye box.

In accordance with another embodiment, the display system includes a second additional lens overlapping the output coupler and through which the world light is viewable at the eye box, the waveguide is interposed between the first and second additional lenses and the first additional lens is interposed between the waveguide and the GRIN lens.

In accordance with another embodiment, the second additional lens has a positive optical power with a first magnitude, the first additional lens has a first negative optical power with the first magnitude, and the GRIN lens has a second negative magnitude with a second magnitude greater than the first magnitude.

In accordance with another embodiment, the second additional lens is a plano-convex lens and the first additional lens is a plano-concave lens.

In accordance with another embodiment, the waveguide is interposed between the GRIN lens and the first additional lens, the GRIN lens has a shape selected from the group consisting of a plano-convex shape, a plano-concave shape, and a convex concave shape.

In accordance with another embodiment, the GRIN lens has a negative optical power with a first magnitude and the first additional lens has a positive optical power with a second magnitude that is less than the first magnitude.

In accordance with another embodiment, the GRIN lens has a positive optical power with a first magnitude and the first additional lens has a negative optical power with a second magnitude that is greater than the first magnitude.

In accordance with an embodiment, a display system is provided that includes a display module that produces image light, a waveguide, an input coupler configured to couple the image light into the waveguide, an output coupler on the waveguide, the output coupler is configured to couple the image light out of the waveguide and to direct the image light towards an eye box, and imaging optics configured to direct the image light towards the input coupler, the imaging optics includes a gradient index (GRIN) lens element having a gradient refractive index.

In accordance with another embodiment, the input coupler includes a GRIN input coupling prism having an additional gradient refractive index.

In accordance with an embodiment, the display system is provided that concludes a GRIN lens overlapping the output coupler, the GRIN lens has a first additional gradient refractive index and world light from a real-world object is viewable at the eye box through the GRIN lens and the output coupler, the input coupler includes a GRIN input coupling prism having a second additional gradient refractive index.

The foregoing is merely illustrative and various modifications can be made to the described embodiments. The foregoing embodiments may be implemented individually or in any combination.

What is claimed is:

1. A display system comprising:
   a display module that produces image light;
   a waveguide having first and second opposing surfaces;
   an input coupler configured to couple the image light into the waveguide, wherein the input coupler comprises an input coupling prism or a first diffractive grating;
   a second diffractive grating configured to diffract the image light out of the waveguide; and
   a gradient index (GRIN) lens separate from the second diffractive grating and the waveguide, wherein the second diffractive grating is interposed between the GRIN lens and the waveguide along an axis perpendicular to the first surface, wherein the GRIN lens has a gradient refractive index, and wherein world light passes through the GRIN lens.

2. The display system of claim 1, further comprising:
   a first additional lens overlapping the second diffractive grating along the axis and through which the world light and the image light pass.

3. The display system of claim 1, further comprising:
   a second additional lens overlapping the second diffractive grating along the axis and through which the world light passes, wherein the waveguide is interposed between the first and second additional lenses and wherein the first additional lens is interposed between the waveguide and the GRIN lens.

4. The display system of claim 3, wherein the second additional lens has a positive optical power with a first magnitude, wherein the first additional lens has a first negative optical power with the first magnitude, and wherein the GRIN lens has a second negative magnitude with a second magnitude greater than the first magnitude.

5. The display system of claim 4, wherein the second additional lens is a plano-convex lens and the first additional lens is a plano-concave lens.

6. The display system of claim 1, further comprising:
   a first additional lens overlapping the second diffractive grating along the axis and through which the world light passes, wherein the waveguide is interposed between the GRIN lens and the first additional lens.

7. The display system of claim 6, wherein the GRIN lens has a negative optical power with a first magnitude and wherein the first additional lens has a positive optical power with a second magnitude that is less than the first magnitude.

8. The display system of claim 6, wherein the GRIN lens has a positive optical power with a first magnitude and wherein the first additional lens has a negative optical power with a second magnitude that is greater than the first magnitude.

9. The display system of claim 1, wherein the image light passes through the GRIN lens.

10. The display system of claim 7, wherein the GRIN lens has a shape selected from the group consisting of: a plano-convex shape, a plano-concave shape, and a convex concave shape.

11. The display system of claim 1, wherein the GRIN lens comprises a prescription lens.

12. The display system of claim 1, wherein the GRIN lens comprises an asymmetric lens.

13. A display system comprising:
    a display module that produces image light;
    a waveguide having first and second opposing surfaces;

an input coupler configured to couple the image light into the waveguide, wherein the input coupler comprises an input coupling prism or a first diffractive grating;

a second diffractive grating configured to diffract the image light out of the waveguide;

a gradient index (GRIN) lens separate from the second diffractive grating and the waveguide, wherein the second diffractive grating is interposed between the GRIN lens and the waveguide along an axis perpendicular to the first surface, wherein the GRIN lens has a gradient refractive index, wherein world light passes through the GRIN lens, and wherein the GRIN lens has a negative optical power with a first magnitude; and an additional lens overlapping the second diffractive grating along the axis and through which the world light passes, wherein the waveguide is interposed between the GRIN lens and the additional lens and wherein the additional lens has a positive optical power with a second magnitude that is less than the first magnitude.

14. The display system of claim 13, further comprising:
imaging optics configured to direct the image light towards the input coupler, wherein the imaging optics comprises a first additional GRIN lens having a first additional gradient refractive index.

15. The display system of claim 14, wherein the imaging optics comprises a second additional GRIN lens having a second additional gradient refractive index.

16. The display system of claim 13, wherein the GRIN lens comprises a set of stacked nanolayers having different refractive indices.

17. The display system of claim 13, wherein the waveguide has a first lateral surface facing the imaging optics and a second lateral surface opposite the first lateral surface and wherein the waveguide is configured to propagate the image light toward the output coupler in a direction parallel to the first and second lateral surfaces.

18. The display system of claim 13, wherein the additional lens is an additional GRIN lens having an additional gradient refractive index.

19. The display system of claim 13, wherein the additional lens has a homogenous refractive index.

20. The display system of claim 13, further comprising:
an additional GRIN lens having an additional gradient refractive index, wherein the GRIN lens and the additional GRIN lens are on a same side of the waveguide.

21. A display system comprising:
a display module that produces image light;
a waveguide having first and second opposing surfaces;
an input coupler configured to couple the image light into the waveguide, wherein the input coupler comprises an input coupling prism or a first diffractive grating;
a second diffractive grating configured to diffract the image light out of the waveguide;
a gradient index (GRIN) lens separate from the second diffractive grating and the waveguide, wherein the second diffractive grating is interposed between the GRIN lens and the waveguide along an axis perpendicular to the first surface, wherein the GRIN lens has a gradient refractive index, wherein world light passes through the GRIN lens, and wherein the GRIN lens has a positive optical power with a first magnitude; and
an additional lens overlapping the second diffractive grating along the axis and through which the world light passes, wherein the waveguide is interposed between the GRIN lens and the additional lens and wherein the additional lens has a negative optical power with a second magnitude that is greater than the first magnitude.

22. The display system of claim 21, further comprising:
imaging optics configured to direct the image light towards the input coupler, wherein the imaging optics comprises an additional GRIN lens having an additional gradient refractive index.

23. The display system of claim 21, further comprising:
an additional GRIN lens having an additional gradient refractive index, wherein the additional lens and the additional GRIN lens are on a same side of the waveguide.

24. The display system of claim 21, wherein the additional lens has a gradient refractive index or a homogenous refractive index.

25. The display system of claim 21, wherein the GRIN lens comprises a set of stacked nanolayers having different refractive indices.

* * * * *